United States Patent Office 3,477,106
Patented Nov. 11, 1969

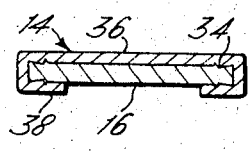
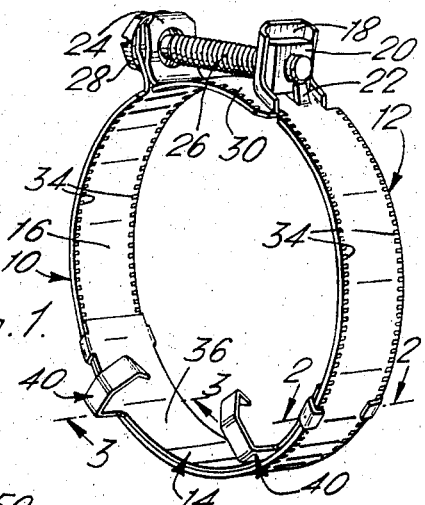
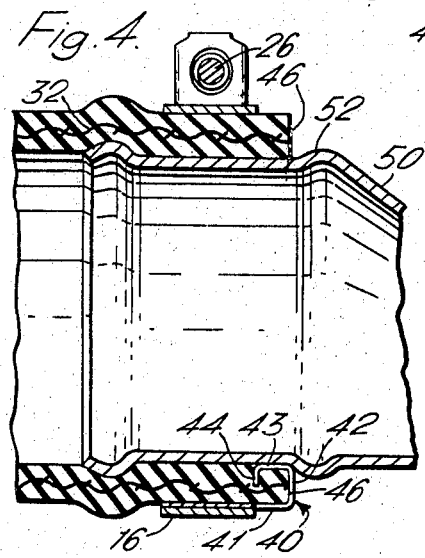
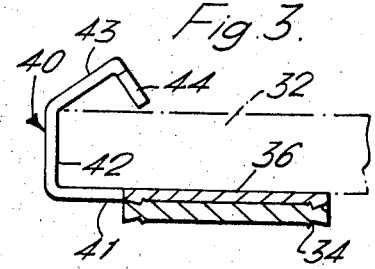
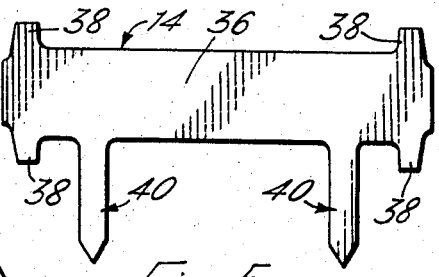
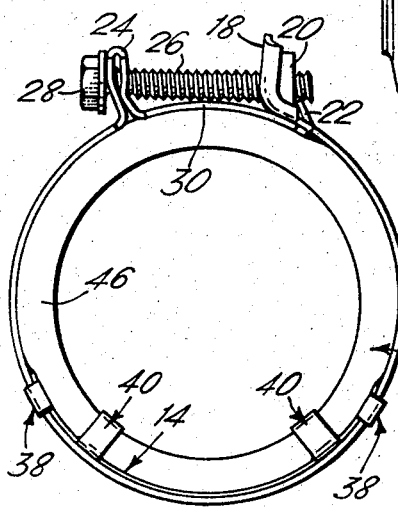

3,477,106
HOSE CLAMP WITH HOSE ATTACHING MEANS
Clarence C. Tetzlaff, River Forest, and George Chamberlain, Cicero, Ill., assignors to Wittek Manufacturing Co., Chicago, Ill., a corporation of Illinois
Continuation-in-part of application Ser. No. 620,472, Mar. 3, 1967. This application Mar. 22, 1968, Ser. No. 715,423
Int. Cl. A44b 21/00
U.S. Cl. 24—279                                         8 Claims

ABSTRACT OF THE DISCLOSURE

A hose clamp of the type which has a metal strap or tension band adapted to be constricted about a length of hose to secure the hose to a spud or fitting in a conventional manner, the hose clamp being intended for securement to a length of hose as an assembly prior to the use of the said length, and the clamp being provided with hose clamp attaching means so that the clamp may be pre-spaced from the hose end and have a known circumferential disposition relative thereto. The hose clamp being of a type which has free ends intended to be brought together when the clamp is tightened by some suitable instrumentality such as a tangential screw, and the hose clamp attaching means comprising a flat strip member fixedly secured to the tension band remote from the tension ends, as by attaching the same diametrically opposite the screw, and said hose clamp attaching means including a pair of prongs of reverse bent bight configuration integral with an edge thereof, each prong having bent parts which enable the prong to be engaged over a hose end to space the clamp therefrom, and then be bent inwardly upon the inner surface of the hose and have a pointed piercing tip enter the wall of the hose in a radial direction, at approximately the axial location of the hose clamp edge so that no interference will be had with the tightening action of the hose clamp when the hose and clamp are installed in their final clamping condition. The preferred form of the structure has knurled ridges along the edges of the hose clamp tension band, and the attaching means has lugs which are bent over the edges of the tension band and pressed into engagement with the surface over said knurled ridges to effect securement and prevent movement of the attaching means relative to the band.

Cross-reference to related applications

This application is a continuation-in-part of application Ser. No. 620,472 filed Mar. 3, 1967 by the applicants herein and entitled "Hose Clamp with Hose-attaching Means," now Patent No. 3,407,448.

Field of the invention

The invention relates to the field of hose clamps of the type which include a constricting metal band adapted to be secured to a soft rubber or the like conduit to attach the conduit to a spud or metal fitting. Examples would be the familiar hose clamp that is used to attach to the flexible resilient hose of a modern internal combustion engine over the spud protruding from the radiator, and the hose clamps used on pipes and conduits of automobile engines. Wherever there is required to be a flexible and/or tortuous liquid-transporting connection between automotive components, there is normally provided a resilient flexible hose secured over metal fittings. Modern engines have many liquid systems involving transportation of oil, water, air-conditioning liquids and the like, and in many cases under high pressure and conditions of heat and stress which, in recent years, have increased the importance of proper securement.

As explained in the co-pending application, the problem of securement during manufacture of the vehicle and assembly of the components is acute due to the errors easily made in proper placement and attachment of hose clamps. Said co-pending application disclosed a structure in which there is an arcuate metal member attached to a conventional hose clamp, this arcuate member having lateral prongs that extend axially from the tension band of the hose clamp and are capable of being pierced into the wall of a hose, the prongs being shaped so that they extend around the axial end of the hose and are engaged on the interior of the hose, piercing the wall at approximately the location of the tension band or between it and the hose end. This structure was intended to be pre-assembled to a length of hose and thereby handled by the workman on the production line as an assembled unit, but with the clamps loosely secured, tension wise, so that after the hose ends are pushed upon their respective fittings, the workman was required only to turn the screws to constrict the clamps to a finally installed condition.

This basic concept of pre-assembling hose clamps upon lengths of hose to be handled by the workmen as units is well-known. Prior structures had much to be desired of them, since as a rule the hose clamps were wire and were secured in place upon the hose length by means of staples. These pierced the outer wall of the hose thereby giving rise to possible weakening and leakage, and their location had to be gauged by some means during pre-assembly. Additionally, it was possible for the hose clamp to move circumferentially relative to the hose so that the location of the screw could not be ensured for most efficient installation by the workman.

The structure of the co-pending application solved these problems through the use of the hose attaching member there disclosed, combining the benefits with those of a load distributing member of the type shown in U.S. Patent 3,388,438 issued to one of the applicants herein.

The invention herein uses a hose clamp attaching member that is quite similar to the load distributing member above mentioned, but serves little if any function to distribute load. It is tightly secured to the tension band of a hose clamp at a location remote from the free ends of the band, preferably diametrically opposite the location of the free ends, and thereby it provides numerous advantages, in addition to those in common with the structure of the co-pending application.

The application of the hose clamp attaching member to the tension band being a tight one, there is normally no movement of the hose clamp relative to the said attaching member hence the hose clamp may be attached to the end of a length of hose in a precise circumferential disposition (the spacing of the tension band from the end of the length of hose is a quantity inherent in the dimensions of the prongs and their bends). This disposition will remain the same during the handling of the assembly of hose clamps and hose length, and the workman will have the clamp at the precise and most efficient location that has been evolved by the production engineers and designers. Here he is best able to use his tightening tools.

Further, since the hose clamp attaching member is located remote from the opening defined by the free ends of the tension member, it is substantially not affected when the hose clamp is tightened in place. The movement of the ends of the tension band toward or away from one another does not materially affect the band at locations diametrically opposite such ends, whereby there will be practically no strain placed upon the prongs or hose, notwithstanding the fact that the hose, hose clamp and hose clamp attaching means are secured together and are substantially fixed in relaton to one another. Such movement as might occur due to decrease of diameter of the hose clamp is minimal, and its effect upon the hose and prongs is negligible. Practically all hose clamps used in the automative field are chosen to have the optimum of diameter giving the least amount of constriction movement during tightening.

Summary of the invention

For the most part the invention will be understood from the discussion above. Specifically, the invention comprises the combination resulting from the securement of a hose attaching member of arcuate form to a hose clamp, the member being made of flat sheet metal stamped in a blank and having outwardly extending lateral lugs which can be reverse bent and engaged over the edges of the flat tension band of the hose clamp. One lateral edge of the blank has a pair of spaced laterally extending prongs that are bent to a generally hooked shape at any suitable time, preferably before attaching to the tension band. Each prong consists of four integrally bent parts exactly as disclosed in the co-pending application. The first part lies generally in the plane of the tension band and establishes the spacing of that edge from the end of the hose. The second part is bent at a right angle radially inward and has a length chosen to be approximately the thickness of the hose to which the hose clamp is to be secured. The third part is further bent inwardly, but is at an angle so that the hose clamp may be properly positioned on the hose before securement of the hose clamp. Its length is approximately the same as the length of the first part, so that the right angle toothed end which is attached thereto will enter the inner wall of the hose after securement, at a location approximately spaced from the end of the hose the same distance as the hose clamp edge.

The hose clamp to which the hose clamp attaching member is secured is of any conventional construction using a flat tension band, and the location of the attaching member is remote from the free ends of the tension band, preferably diametrically opposite the same. Thus, considering a tangential screw type of hose clamp, the attaching member is fixed to the tension band on the interior thereof diametrically opposite the screw. A conventionall tangential screw type of hose clamp has knurling along the edges of the band. Such knurling is the result of manufacturing processes during which the band is rolled in a forming machine, and will produce a roughness or ridges. When the securing lugs of the hose clamp attaching member are pressed against this type of formation, the attachment is quite secure and the likelihood of relative sliding movement between the attaching member and the tension band is remote.

Brief description of the figures

FIG. 1 is a perspective view showing a tengential hose clamp constructed according to the invention, having a hose clamp attaching member connected thereto.

FIG. 2 is a sectional view on an exaggerated scale taken generally along the line 2—2 of FIG. 1 and in the indicated direction.

FIG. 3 is a sectional view on an exaggerated scale taken generally along the line 3—3 of FIG. 1 and in the indicated direction.

FIG. 4 is a fragmentary sectional view taken through a portion of a hose clamp secured to a spud, illustrating the manner in which the hose clamp of the invention is mounted to the hose.

FIG. 5 is a plan view of a developed blank used to form the hose clamp attaching member of the invention.

FIG. 6 is an end view of a section of hose having the clamp of the invention secured thereto.

DESCRIPTION OF THE PREFERRED EMBODIMENT

The hose clamp of the invention is designated by the reference numeral 10 and is comprised of two parts, a conventional hose clamp 12 and a hose clamp attaching member 14 affixed thereto. The preferred hose clamp 12 is a tangential screw type, having a looped flat sheet metal tension band 16 whose free ends meet at the top in FIG. 1, and are adapted to be drawn together by a simple screw. The reference to free ends is general, and intended to signify the location of tension points used to constrict the clamp. Thus, the tension band 16 has a recessed ear 18 formed on one end in which there is seated a nut 20 held in place by a tongue 22. The second end has a pinch or bight 24 pierced to pass a screw 26 and thus forming a second ear to support the head 28 of the screw. A continuation 30 of the pinch 24 which passes under the recessed ear 18 serves as an overlapping member to prevent pinching of the hose 32 (see FIG. 6) when the free ends are brought together. The functional free ends of the hose clamp 12 are thus represented by the tension points at locations of the ear 24 and the ear 18.

In the manufacture of this kind of hose clamp, the looped tension band 16 is normally formed by the use of pinch rollers which are ridged to grip the steel band. These ridged rollers in most cases will produce a knurling along the edges of the band 16, as indicated at 34, and metal will be upset giving a roughened formation. The knurling is on both surfaces of the band 16, and while this occurrence is coincidental to the manufacture of the basic hose clamp, it is used to advantage in the preferred embodiment of the invention.

As thus far described, the hose clamp 12 is conventional and is of a form which has been in use for a great many years. This does not militate against the invention, since one of the advantages is that the machinery and methods for manufacturing these hose clamps need not in any way be altered. The conventional hose clamp 12 may be taken from stock by the manufacturer and used to achieve the invention by the addition of another member, namely member 14.

The member which is added to the hose clamp 12 is the hose clamp attaching member 14. In blank form (FIG. 5) the member 14 comprises an elongate strip of sheet metal having a generally rectangular body 36 with lateral integral short lugs 38 formed along its edges (top and bottom in FIG. 5) adjacent its ends. Two parallel, elongate prongs 40 are integral with one edge, these prongs comprising four parts which will be bent relative one another in the completed hose clamp. The parts are best seen in FIGS. 1, 3 and 4. The first part 41 is not bent relative to the body 36 and hence lies in the plane of the body. When the member 14 eventually is installed on the hose clamp tension band 16 as shown in FIG. 1, this part will lie in the arcuate plane of the body 36, but more importantly will lie in the arcuate plane defined by the inner surface of the tension band 16 at the location of the member 14. It is considered to extend axially of the hose clamp, the axis being that of the cylinder generally defined by the main loop of the band 16.

The member 14 is fixed to the inside of the tension band 16 by forming it into a conforming arcuate configuration, placing it in surface to surface engagement with the inside of the band 16 opposite the screw 26, and then bending the lugs 38 around the edges of the band and pressing them tightly against the outer surface of the band adjacent the edges thereof and on top of the knurling 34. The result is a substantially fixed connection. The upset ridges inherent in knurled areas will bite into the lugs 38 as indicated in FIG. 2.

The length of the part 41 is chosen to be substantially equal to the distance that it is desired the edge of the hose clamp 12 will be from the end of the hose 32. Looking at FIGS. 3 and 4, this will be obvious because the second part 42 is formed by making a right angle bend in the prongs in a radially inward direction, this being considered relative to the loop formed by the tension band 16. This second part 42 thus forms a stop member against which the end 46 of the hose length 32 will abut when the structure 10 is fitted to such hose length.

The third part 43 is formed by making still another bend radially inward, thus commencing to form a curled bight or hook, but the angle of the bend is not 90° but somewhat greater as best shown in FIG. 3. The eventual disposition of the part 43 relative to the part 42 will be a right angle, as readily seen in FIG. 4, but in order to enable the clamp 10 to be installed, obviously there must be sufficient space to clear the inward movement of the hose end 46. The length of the part 42 is chosen to be approximately the thickness of the hose wall as indicated clearly in FIGS. 3 and 4 for reasons which are obvious, and the length of the part 43 is chosen to place the location of the piercing point of the end part 44. The pointed part 44 is preferably clear of the tension band 16 so that it will not interfere with the action of the hose clamp during the tightening process, and for this purpose, its length should be approximately equal to or shorter than the length of the first part. Of course in choosing the lengths of the four parts of the prongs 40, one must consider metal thickness, the effect of bending, etc., but these techniques are well known. In describing lengths of parts, this is presumed to be understood by those skilled in this art.

The hose clamp 10 is sold by the manufacturer in its assembled condition as shown in FIG. 1. The prongs are open to the configuration shown in FIG. 3. When the engine manufacturer receives the hose clamps and decides where they are going to be used, and their disposition relative to the hose and engine fittings, he prepares a suitable fixture which will locate the circumferential position of the clamp 10 with respect to the particular hose length to which it will be fixed. It should be appreciated that substantially all lengths of hose used in modern automobiles at the present time are molded to shape and reinforced with internal stiffeners, so that the placement of the hose clamps is extremely important.

The dimensions of the parts of the prongs of the hose clamp 10 are known to the purchaser, since he has ordered the clamps by specification. There is a fairly wide-spread amount of leeway available, but normally the exact dimensions are known, chosen, or specifically built into the hose clamp.

The hose lengths are placed in the fixture, and a suitable mechanism moves into the interior of the hose end and clinches the parts 43 and 44 of the prongs 40 into their final position, this being illustrated in FIG. 4. The parts 43 and 44 are now parallel with the respective parts 41 and 42, and the hose clamp 10 is permanently secured to the hose 32. It will be appreciated that the prongs enter the end of the hose, and the piercing which occurs is on the interior of the hose between the clamp tension band 16 and the hose end 46.

In this condition, a stock of assembled hose sections is built up ready for use. These assemblies are readily stored and transported, and can be made up in advance of production. The screw 26 is not taken up, and the tension ends of the band 16 are thus relatively movable.

When the hose assembly is to be used, the workman applies the ends to the respective fittings which it will connect. In FIG. 4, a fragment of a radiator spud is shown at 50, the hose end 46 being pressed onto the spud until it reaches the ridge 52, or some other designated stop means. The workman then commences taking up on the screw by a suitable power driver. As he does, he moves the tension ends 24 and 18 of the tension band 16 together, decreasing the distance between them and constricting the hose clamp 10 around the hose 32. Examining FIG. 6 will show that the amount of movement which will occur between the two prongs 40 during the constriction of the band is so slight that it is of no significance. There cannot be any tearing or damage to the hose and certainly not to the clamp 10. This is achieved by the location of the hose clamp attaching member 14 remote from the free ends of the tension band.

Any hose clamp of the type which utilizes a flat straplike metal tension band could be constructed with a hose clamp attaching member located remote from its open ends to achieve the advantages of the invention.

In the event that there is any movement of consequence of the prongs during tightening of the hose clamp, such movement is accompanied by similar movement of the tension band and the movement of the hose itself in constricting, so that in effect there is substantially no relative movement at all between these three elements. The larger the diameter of the hose and hose clamp, the less chance there is of movement.

What it is desired to secure by Letters Patent of the United States is:

1. A hose clamp of the type adapted to be secured over the end of a length of hose in a predetermined location on said hose length prior to use of the hose length and clamp to enable the resulting assembly to be handled as a unit when it is desired to install the hose length upon a suitable fitting, said hose clamp comprising:
   (A) a hose clamp having a flat generally circular tension band provided with a pair of tension ends adapted to be drawn together in constricting the hose clamp upon a hose length, a screw connecting the said ends and arranged to be turned to bring said ends together,
   (B) hose clamp attaching means secured to said tension band at a location remote from said tension ends, and comprising,
      (i) a flat arcuate member overlying the band and in face to face engagement with one surface thereof, said arcuate member being of sheet material and having means fixedly securing same in position relative to said hose clamp,
      (ii) a pair of spaced prongs integral with said arcuate member and extending laterally from one edge thereof in a direction generally axially of the hose clamp and each having a connecting part lying in the plane of the tension band at the point of connection with said arcuate member, each connecting part having a second part at its end spaced from said one edge at right angles to said connecting part to serve as stop means when the clamp is secured to the end of a hose length, and
      (iii) each prong additionally having further parts connected with said second part forming a bight with an end piercing part adapted to be bent into piercing engagement with the interior of a hose length when the clamp is assembled thereon.

2. The hose clamp of claim 1 in which the hose clamp attaching means is secured diametrically opposite said screw.

3. The hose clamp of claim 2 in which the hose clamp is of the tangential screw variety.

4. The hose clamp of claim 1 in which said hose clamp attaching means is of substantially the same width as the tension band in an axial direction, and said securing means comprise integral laterally extending lugs on opposite edges of said flat arcuate member, said lugs being reverse bent about the opposite edges of said tension band and pressed into tight engagement with the surface of said tension band opposite to said one surface against which the hose clamp attaching means is engaged.

5. The hose clamp of claim 4 in which the said one surface of said tension band is the interior of the tension band and the lugs are engaged to the exterior surface of the tension band.

6. The hose clamp of claim 5 in which the hose clamp attaching means is secured diametrically opposite said screw.

7. The hose clamp of claim 4 in which said tension band is provided with roughened areas on the surface against which said lugs are engaged and at least at locations on said surface such that the lugs will be pressed against said roughened areas to form a tight connection therewith.

8. The hose clamp of claim 7 in which said roughened areas comprise knurled ridges.

References Cited
UNITED STATES PATENTS

| | | | |
|---|---|---|---|
| 1,354,669 | 10/1920 | Levedahl | 285—253 X |
| 2,283,179 | 5/1942 | Buckingham | 24—279 |
| 3,365,218 | 1/1968 | Denyes | 24—19 X |

DONALD A. GRIFFIN, Primary Examiner

U.S. Cl. X.R.

24—253